(12) United States Patent
Lee et al.

(10) Patent No.: US 7,539,035 B2
(45) Date of Patent: May 26, 2009

(54) MEMORY SYSTEM CAPABLE OF CHANGING CONFIGURATION OF MEMORY MODULES

(75) Inventors: Jae-jun Lee, Seongnam-si (KR); Jong-hoon Kim, Hwaseong-si (KR); Kwang-soo Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 317 days.

(21) Appl. No.: 11/649,266

(22) Filed: Jan. 4, 2007

(65) Prior Publication Data
US 2007/0161264 A1 Jul. 12, 2007

(30) Foreign Application Priority Data
Jan. 9, 2006 (KR) ...................... 10-2006-0002377

(51) Int. Cl.
*G11C 11/00* (2006.01)
(52) U.S. Cl. .................................... 365/63; 365/230.06
(58) Field of Classification Search ................... 365/63, 365/230.06
See application file for complete search history.

(56) References Cited

U.S. PATENT DOCUMENTS

| | | | |
|---|---|---|---|
| 6,796,803 B2 | 9/2004 | Abe | |
| 6,832,177 B2 | 12/2004 | Khandekar et al. | |
| 7,106,613 B2 * | 9/2006 | Yoon et al. | ...................... 365/63 |
| 7,215,561 B2 * | 5/2007 | Park et al. | ...................... 365/52 |

FOREIGN PATENT DOCUMENTS

KR 1020040110550 12/2004

* cited by examiner

*Primary Examiner*—Michael T Tran
(74) *Attorney, Agent, or Firm*—Volentine & Whitt, PLLC

(57) ABSTRACT

A memory system is disclosed with first, second, and third connectors located on a system board, the third connector including pins connected to the pins of the first and second connectors through channels, and a memory controller connected to the pins of the third connector through channels. The memory system, as configured in a first memory capacity, comprises; dummy memory modules and a first memory module connected to the memory controller by installing the dummy memory modules in the first and second connectors and installing the first memory module in the third connector. The memory system, as alternately configured in a second memory capacity larger than the first memory capacity, comprises second memory modules connected to the memory controller by installing the second memory modules in only the first and second connectors.

18 Claims, 5 Drawing Sheets

MEMORY SYSTEM CAPABLE OF CHANGING CONFIGURATION OF MEMORY MODULES

BACKGROUND OF THE INVENTION

1. Field of the Invention

The present invention relates to a memory system. More particularly, the invention relates to a memory system capable of changing the configuration of its constituent memory modules.

This application claims the benefit of Korean Patent Application No. 10-2006-0002377, filed on Jan. 9, 2006, the subject matter of which is hereby incorporated by reference.

2. Description of the Related Art

Semiconductor memory devices such as dynamic random access memories (DRAMs) are widely used for computer systems such as personal computers and servers. To achieve high performance and high capacity, a plurality of semiconductor memory devices are commonly mounted on one or more memory modules. The memory modules are installed into a system board or motherboard of a computer system.

Generally, the memory system includes a memory controller, memory modules, and connectors (or sockets) in which the memory modules are installed. The connectors connect the memory controller to the memory modules through the channels (or wires) of the system board.

In some cases, a user of the memory system desires to change the configuration of the memory modules. That is, the user desires to selectively use a relatively higher or lower capacity memory system by changing the configuration of the memory modules.

SUMMARY OF THE INVENTION

The present invention provides a memory system capable of changing the configuration of memory modules.

In one embodiment, the invention provides a memory system comprising;

first, second and third connectors located on a system board, the third connector including pins connected to pins of both the first and second connectors through channels, and a memory controller connected to the pins of the third connector through channels, wherein the memory system, as configured in a first memory capacity, comprises; dummy memory modules and a first memory module connected to the memory controller by installing the dummy memory modules in the first and second connectors and installing the first memory module in the third connector, and wherein the memory system, as alternately configured in a second memory capacity larger than the first memory capacity, comprises second memory modules connected to the memory controller by installing the second memory modules in only the first and second connectors.

In another embodiment, the invention provides a memory system comprising; a first connector located on a system board and including pins, a second connector located on the system board and including pins connected to some of the pins of the first connector through channels, and a memory controller connected to some of the pins of the first connector and the pins of the second connector through channels, wherein the memory system, as configured in a first memory capacity, comprises; a first memory module connected to the memory controller by installing the first memory module in only the first connector, and wherein the memory system, as alternately configured in a second memory capacity larger than the first memory capacity, comprises a second memory module and a third memory module connected to the memory controller by installing the second memory module in the first connector and installing the third memory module in the second connector.

In another embodiment, the invention provides a memory system comprising; a first connector located on a system board, a second connector located on the system board, and a memory controller connected to the pins of the first and second connectors through channels, wherein the memory system, as configured in a first memory capacity, comprises, an auxiliary connector installed in the first and second connectors and including pins connected to pins of the first and second connectors; and a first memory module connected to the memory controller by installing the first memory module in only the auxiliary connector, and wherein the memory system, as alternatively configured in a second memory capacity larger than the first memory capacity, comprises, second memory modules connected to the memory controller by installing the second memory modules in the first and second connectors.

BRIEF DESCRIPTION OF THE DRAWINGS

FIG. (FIG.) 1 is block diagram showing a memory system according to an embodiment of the present invention.

DESCRIPTION OF EMBODIMENTS

Figure 1:
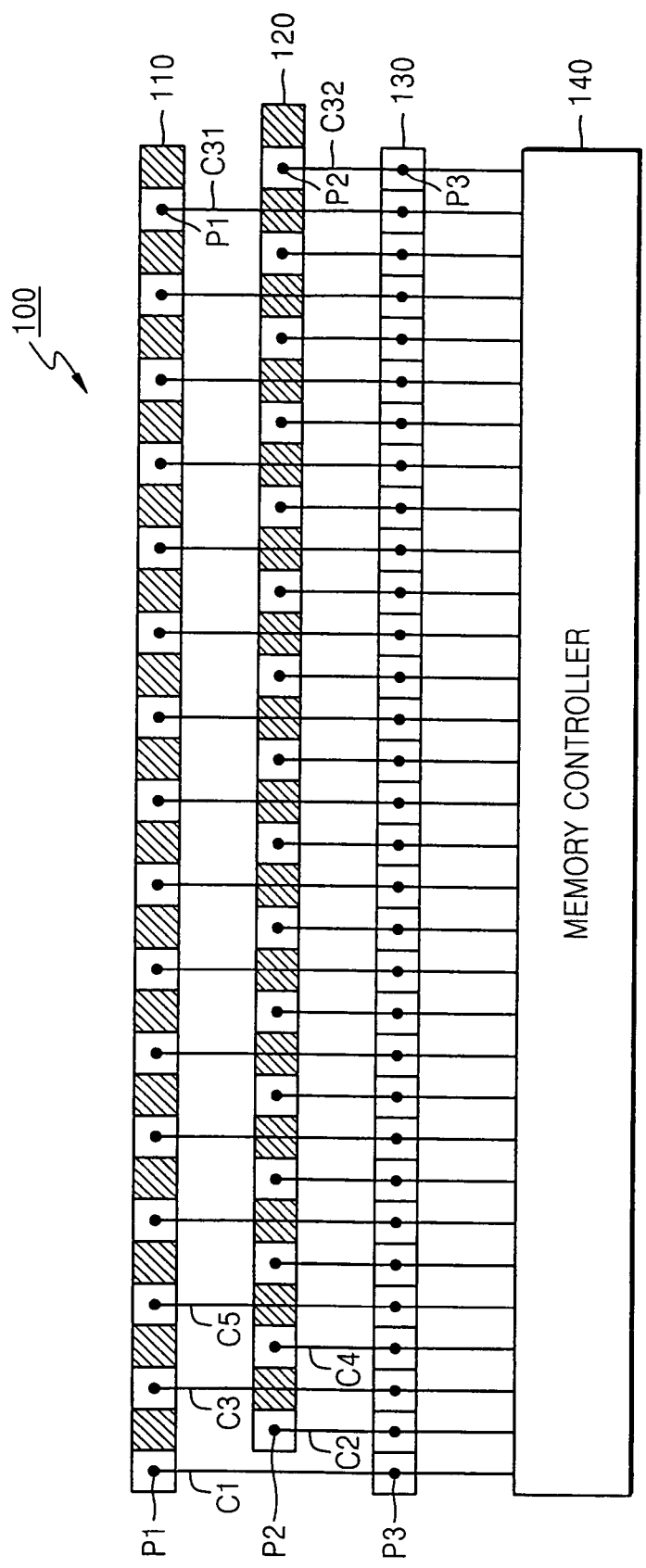

Embodiments of the invention are illustrated in the attached drawings and are presented as teaching examples. Throughout the written description and drawings like reference numerals denote like or similar elements.

FIG. 1 is block diagram of a memory system according to an embodiment of the invention. Referring to FIG. 1, a memory system 100 includes first, second, and third connectors 110, 120 and 130 and a memory controller 140. The first, second, and third connectors 110, 120 and 130 and the memory controller 140 may be located on the system board (not shown).

The first, second, and third connectors 110, 120 and 130 connect the memory controller 140 to memory modules installed in the first, second, and third connectors 110, 120 and 130 through channels C1~C32 of the system board. That is, pins P1 of the first connector 110, pins P2 of the second connector 120, and pins P3 of the third connector 130 are connected (or routed) to the memory controller 140 through the channels C1~C32 of the system board. Each of the channels C1~C32 is a data channel through which data is transmitted.

The pins P1 of the first connector 110 are connected to the pins P3 of the third connector 130 through the corresponding channels, and the pins P3 of the third connector 130 are connected to the memory controller 140 through the corresponding channels. The channels C3, C5, . . . , and C31 are not connected to the pins P2 of the second connector 120 and may be connected through vias inside the system board. The pins of the first connector 110 which are not used are represented by shaded areas.

The pins P2 of the second connector 120 are connected to the pins P3 of the third connector 130 through the corresponding channels, and the pins P3 of the third connector 130 are connected to the memory controller 140 through the corresponding channels. The pins of the second connector 120 which are not used are represented by shaded areas.

When the memory system 100 has a first memory capacity (sometimes, referred to as a first data storage capacity), dummy modules (not shown) are installed in the first and second connectors 110 and 120, and a first memory module (not shown) is installed in the third connector 130.

Figure 2A:
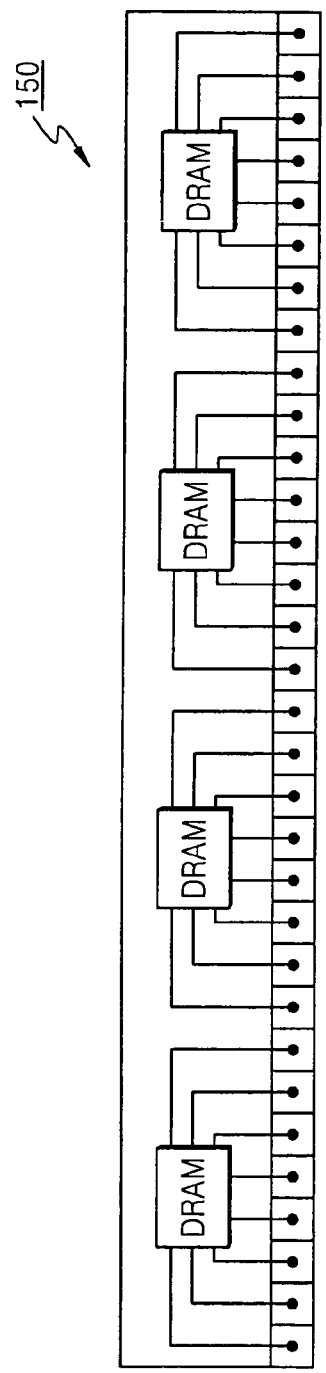
FIG. 2A shows a first memory module to be installed in a third connector shown in FIG. 1 according to an embodiment of the present invention.
Figure 2B:
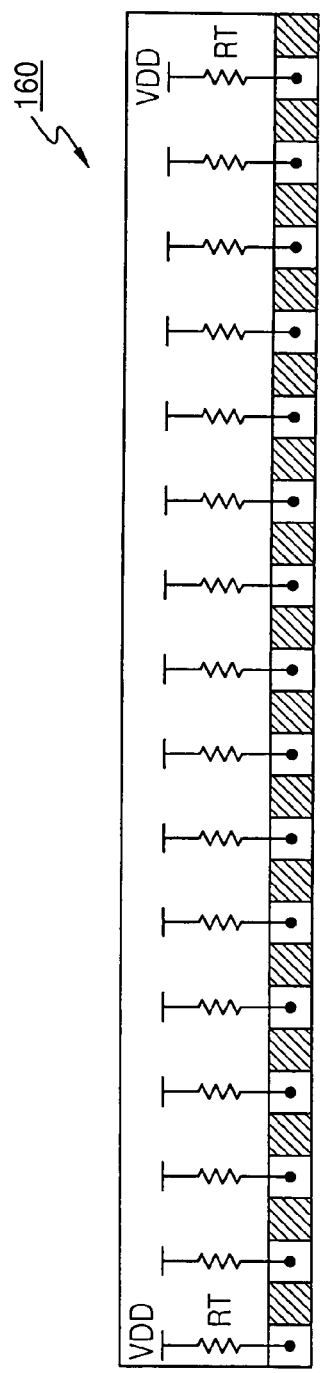
FIG. 2B shows a dummy memory module to be installed in the first and second connectors shown in FIG. 1 according to an embodiment of the present invention.

The first memory module according to an embodiment of the present invention is shown in FIG. 2A, and the dummy memory module according to an embodiment of the present invention is shown in FIG. 2B.

Referring to FIG. 2A, the first memory module 150 has 32 pins, is a single in-line memory module, and includes 4 DRAMs. The data bus width of each DRAM is ×8, and data pins (sometimes, referred to as DQ pins) of each DRAM are connected to the pins (or taps) of the first memory module 150.

Referring to FIG. 2B, DRAM are not mounted on the dummy memory module 160, and the dummy memory module 160 is a SIMM and includes termination resistors RT connected to the pins of the dummy memory module 160. A power supply voltage VDD may be applied to one terminal of each termination resistor.

Since the signal reflection in the channel is reduced by allowing the dummy memory module 160 including the termination resistors RT to be installed in the first and second connectors 110 and 120, the signal integrity of the data channel can be improved. The pins of the dummy memory module 160 which are not used are represented by shaded areas.

Referring to FIG. 1, when the memory system 100 has a second memory capacity larger than the first memory capacity, the second memory modules (not shown) are installed only in the first and second connectors 110 and 120, and the first memory module 150 is not installed in the third connector 130.

Figure 2C:
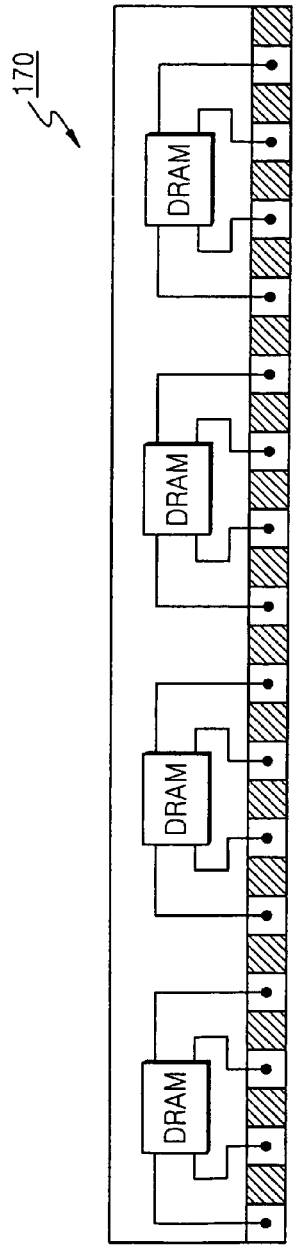
FIG. 2C shows a second memory module to be installed in the first and second connectors shown in FIG. 1 according to an embodiment of the present invention.

The second memory module according to an embodiment of the present invention is shown in FIG. 2C. Referring to FIG. 2C, the second memory module 170 is a SIMM and includes 4 DRAMs. The data bus width of each DRAM is ×4, and the data pins of each DRAM are connected to the pins of the second memory module 170. The pins of the second memory module 170 which are not used are represented by shaded areas. The memory capacity of the second memory module 170 is the same as that of the first memory module 150.

Referring to FIG. 1, the memory controller 140 inputs and outputs data to and from the memory devices of the memory modules installed in the first, second, and third connectors 110, 120, and 130 through the channels C1~C32. The memory controller 140 may be referred to as a chipset.

As described above, the memory system 100 according to the present invention can change the configuration of the memory modules which are controlled by the memory controller 140. Therefore, a user can selectively use the low capacity memory system including the first memory module 150 or the high capacity memory system including the two second memory modules 170.

Although the memory system 100, as an embodiment of the invention, has been described as using SIMM memory modules, it may alternatively or additionally use dual in-line memory modules (DIMMs) having a similar bus width.

Figure 3:
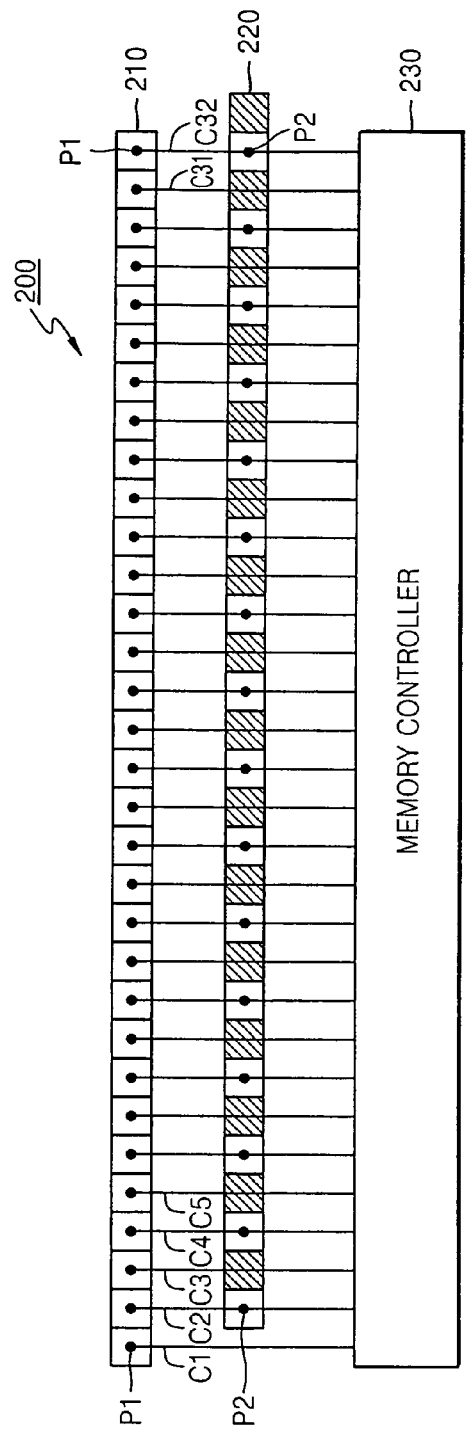
FIG. 3 is a block diagram showing a memory system according to another embodiment of the present invention.

FIG. 3 is a block diagram showing a memory system according to another embodiment of the invention. Referring to FIG. 3, a memory system 200 includes first and second connectors 210 and 220 and a memory controller 230. The first and second connectors 210 and 220 and the memory controller 230 may be located on a system board (not shown).

The first and second connectors 210 and 220 connect the memory controller 230 to the memory modules installed in the first and second connectors 210 and 220 through the channels C1~C32 of the system board. That is, pins P1 of the first connector 210 and pins P2 of the second connector 220 are connected to the memory controller 230 through the channels C1~C32 of the system board. Each of the channels C1~C32 is a data channel through which data is transmitted.

Some of the pins P1 of the first connector 210 are connected to the memory controller 230 through corresponding channels, and others of the pins P1 of the first connector 210 are connected to the pins P2 of the second connector 220 through the corresponding channels. The channels C3, C5, . . . , and C31 are not connected to the pins P2 of the second connector 220 and may be connected through vias inside the system board.

The pins P2 of the second connector 220 are connected to the memory controller 230 through the corresponding channels. The pins of the second connector 220 which are not used are represented by shaded areas.

When the memory system 200 has a first memory capacity, a first memory module is installed in the first connector 210 and no memory module is installed in the second connector 220. The first memory module is the same as the first memory module 150 shown in FIG. 2A.

Referring to FIG. 3, when the memory system 200 has a second memory capacity larger than the first memory capacity, a second memory module (not shown) are installed in the first connector 210 and a third memory module (not shown) is installed in the second connector 220. The second memory module according to an embodiment of the invention is shown in FIG. 4, and the third memory module according to an embodiment of the invention is similar to the second memory module 170 shown in FIG. 2C.

Figure 4:
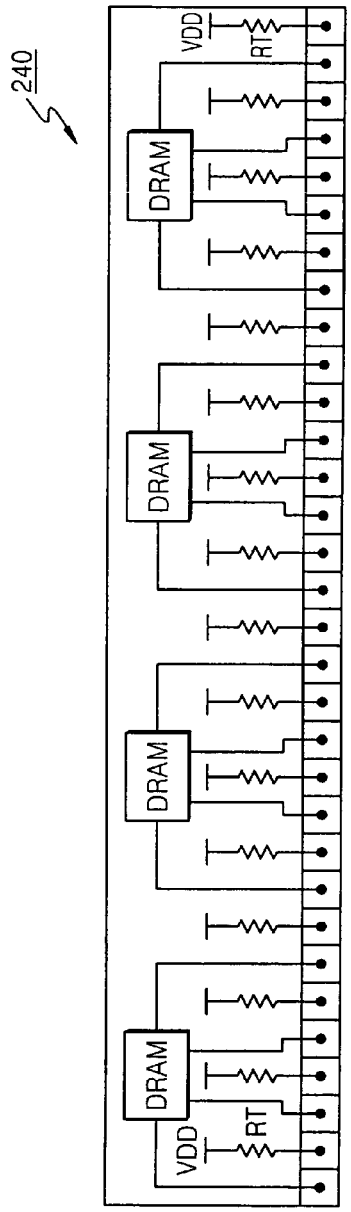
FIG. 4 shows a memory module to be installed in the second connector shown in FIG. 3 according to an embodiment of the present invention.

Referring to FIG. 4, the second memory module 240 is a 32pin SIMM and includes 4 memory devices (DRAM) and termination resistors. The data bus width of each DRAM is ×4, and the data pins of each DRAM are connected to the pins of the second memory module 240. The pins of the second memory module 240 that are not connected to the data pins are connected to the termination resistors RT to improve the integrity of the signals that are transmitted through the channels connected to the third memory module. A power supply voltage VDD may be applied to one terminal of each termination resistor RT.

The memory capacity of the second memory module 240 or the third memory module may be the same as that of the first memory module.

Referring to FIG. 3, the memory controller 230 inputs and outputs data to and from the memory devices of the memory modules installed in the first and second connectors 210 and 220 through the channels.

As described above, the memory system 200 is adapted to change the configuration of its constituent memory modules which are controlled by the memory controller 230. Therefore, a user may selectively use a lower capacity memory system including the first memory module or the higher capacity memory system including the second memory module 240 and the third memory module.

Although the memory system 200, as one embodiment of the invention, has been described as using SIMM memory modules, it may alternatively or additionally use DIMM memory modules having a similar bus width.

Figure 5:
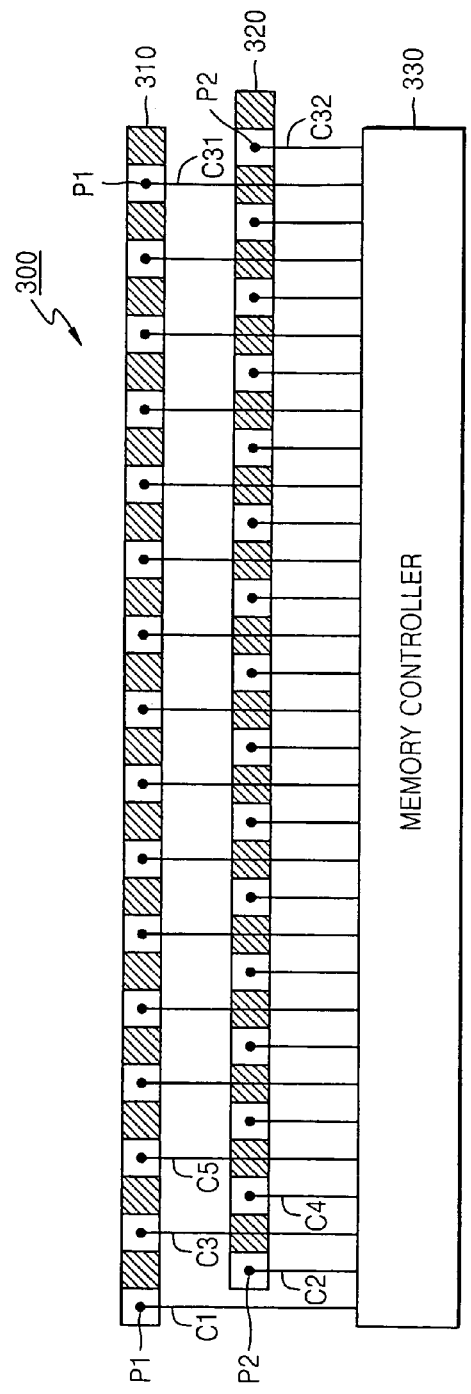
FIG. 5 is a block diagram showing a memory system according to another embodiment of the present invention.

FIG. 5 is a block diagram showing a memory system according to another embodiment of the present invention. Referring to FIG. 5, a memory system 300 includes first and second connectors 310 and 320 and a memory controller 330.

The memory system 300 further includes an auxiliary connector (not shown) that is installed in the first and second connectors 310 and 320 and include the pins connected to the pins P1 of the first connector and the pins P2 of the second connector. The auxiliary connector may be referred to as an interposer.

The first and second connectors 310 and 320 and a memory controller 330 may be located on a system board (not shown). The first and second connectors 310 and 320 connect the memory controller 330 to the memory modules installed in the first and second connectors 310 and 320 through channels C1~C32 of the system board. That is, the pins P1 of the first connector 310 and the pins P2 of the second connector 320 are connected to the memory controller 330 through the channels C1~C32 of the system board. Each of the channels C1~C32 is a data channel through which data is transmitted.

The pins P1 of the first connector 310 are connected to the memory controller 330 through the corresponding channels. The channels C3, C5, . . . , and C31 may be connected through vias inside the system board. The pins of the first connector 310 which are not used are represented by shaded areas.

The pins P2 of the second connector 320 are connected to the memory controller 330 through the corresponding channels. The pins of the second connector 320 which are not used are represented by shaded areas.

When the memory system 300 has a first memory capacity, a first memory module is installed only in the auxiliary connector. The method of installing the first memory module is shown in FIG. 6A.

Figure 6A:
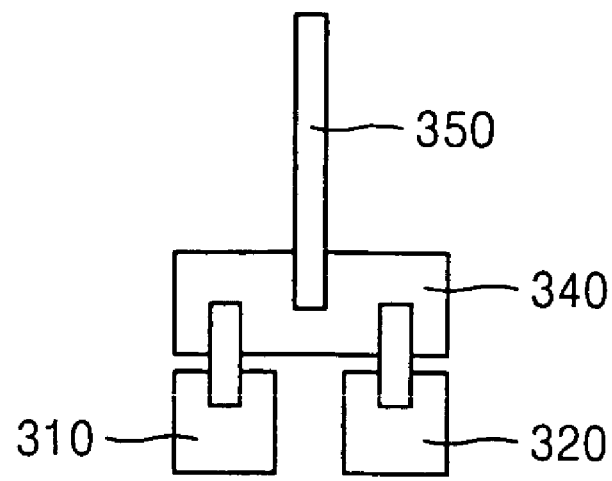
FIG. 6A is a view for explaining a case where the memory system of FIG. 5 comprises a memory module including an ×8 memory device.

Referring to FIG. 6A, the auxiliary connector 340 is installed in the first and second connectors 310 and 320, and the first memory module 350 is installed in the auxiliary connector 340. The first memory module 350 is the same as the first memory module 150 shown in FIG. 2A.

Referring to FIG. 5, when the memory system 300 has a second memory capacity larger than the first memory capacity, the auxiliary connector is removed and the second memory modules (not shown) are installed in the first and second connectors 310 and 320. The method of installing the second memory module is shown in FIG. 6B.

Figure 6B:
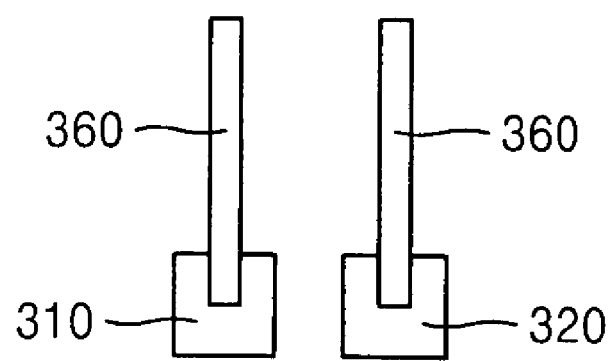
FIG. 6B is a view for explaining a case where the memory system of FIG. 5 comprises memory modules including an ×4 memory device.

Referring to FIG. 6B, the second memory modules 360 are installed in the first and second connectors 310 and 320. The second memory module 360 is the same as the second memory module 170 shown in FIG. 2C. The memory capacity of the second memory module 360 is the same as that of the first memory module 350.

Referring to FIG. 5, the memory controller 330 inputs and outputs data to and from the memory devices of the memory modules installed in the first and second connectors 310 and 320 through the channels.

As described above, the memory system 300 may change the configuration of the memory modules which are controlled by the memory controller 330. Therefore, a user may selectively use the lower capacity memory system including the first memory module 350 or the higher capacity memory system including the two second memory modules 360.

Although the memory system 300, as an embodiment of the invention, has been described as using SIMM memory modules, it may alternatively or additionally use DIMM memory modules having a similar bus width.

While the present invention has been particularly shown and described with reference to certain exemplary embodiments, it will be understood by those of ordinary skill in the art that various changes in form and detail may be made therein without departing from the scope of the present invention as defined by the following claims.

What is claimed is:

1. A memory system comprising:
   first, second and third connectors located on a system board, the third connector including pins connected to pins of both the first and second connectors through channels, and a memory controller connected to the pins of the third connector through channels,
   wherein the memory system, as configured in a first memory capacity, comprises; dummy memory modules and a first memory module connected to the memory controller by installing the dummy memory modules in the first and second connectors and installing the first memory module in the third connector, and
   wherein the memory system, as alternately configured in a second memory capacity larger than the first memory capacity, comprises second memory modules connected to the memory controller by installing the second memory modules in only the first and second connectors.

2. The system of claim 1, wherein the dummy memory module comprises a termination resistor.

3. The system of claim 2, wherein a power supply voltage is applied to one terminal of the termination resistor.

4. The system of claim 1, wherein the first memory module includes an ×8 memory device, and the second memory module includes an ×4 memory device.

5. The system of claim 1, wherein the first and second memory modules and the dummy memory module are Single In-line Memory Modules (SIMMs).

6. The system of claim 1, wherein some of the pins of the first connector are connected to the pins of the third connector through vias inside the system board.

7. The system of claim 1, wherein the first memory module has the same memory capacity as each of the second memory modules.

8. A memory system comprising:
   a first connector located on a system board and including pins;
   a second connector located on the system board and including pins connected to some of the pins of the first connector through channels; and
   a memory controller connected to some of the pins of the first connector and the pins of the second connector through channels,
   wherein the memory system, as configured in a first memory capacity, comprises; a first memory module connected to the memory controller by installing the first memory module in only the first connector, and wherein the memory system, as alternately configured in a second memory capacity larger than the first memory capacity, comprises a second memory module and a third memory module connected to the memory controller by installing the second memory module in the first connector and installing the third memory module in the second connector.

9. The system of claim 8, wherein the first memory module includes an ×8 memory device, the second memory module includes an ×4 memory device and a termination resistor, and the third memory module includes an ×4 memory device.

10. The system of claim 9, wherein a power supply voltage is applied to one terminal of the termination resistor.

11. The system of claim 8, wherein the first, second, and third memory modules are Single In-line Memory Modules (SIMMs).

12. The system of claim 8, wherein some of the pins of the first connector are connected to the memory controller through vias inside the system board.

13. The system of claim 8, wherein the first, second, and third memory modules have the same memory capacity.

14. A memory system comprising:
a first connector located on a system board;
a second connector located on the system board; and,
a memory controller connected to the pins of the first and second connectors through channels, wherein the memory system, as configured in a first memory capacity, comprises;
an auxiliary connector installed in the first and second connectors and including pins connected to pins of the first and second connectors; and,
a first memory module connected to the memory controller by installing the first memory module in only the auxiliary connector, and wherein the memory system, as alternatively configured in a second memory capacity larger than the first memory capacity, comprises;
second memory modules connected to the memory controller by installing the second memory modules in the first and second connectors.

15. The system of claim 14, wherein the first memory module includes an ×8 memory device, and the second memory module includes an ×4 memory device.

16. The system of claim 14, wherein the first and second memory modules are Single In-line Memory Modules (SIMMs).

17. The system of claim 14, wherein some of the pins of the first connector are connected to the memory controller through vias inside the system board.

18. The system of claim 14, wherein the first memory module has the same memory capacity as the second memory module.

* * * * *